United States Patent
Cui et al.

(10) Patent No.: US 10,082,383 B2
(45) Date of Patent: Sep. 25, 2018

(54) METHOD AND EQUIPMENT FOR DIMENSIONAL MEASUREMENT OF A MICRO PART BASED ON FIBER LASER WITH MULTI-CORE FBG PROBE

(71) Applicant: HARBIN INSTITUTE OF TECHNOLOGY, Harbin, Heilongjiang (CN)

(72) Inventors: Jiwen Cui, Heilongjiang (CN); Shiyuan Zhao, Heilongjiang (CN); Kunpeng Feng, Heilongjiang (CN); Hong Dang, Heilongjiang (CN); Junying Li, Heilongjiang (CN); Jiubin Tan, Heilongjiang (CN)

(73) Assignee: HARBIN INSTITUTE OF TECHNOLOGY, Harbin, Heilongjiang (CN)

( * ) Notice: Subject to any disclaimer, the term of this patent is extended or adjusted under 35 U.S.C. 154(b) by 0 days.

(21) Appl. No.: 15/555,028

(22) PCT Filed: Mar. 4, 2016

(86) PCT No.: PCT/CN2016/075592
§ 371 (c)(1),
(2) Date: Aug. 31, 2017

(87) PCT Pub. No.: WO2016/138871
PCT Pub. Date: Sep. 9, 2016

(65) Prior Publication Data
US 2017/0363417 A1 Dec. 21, 2017

(30) Foreign Application Priority Data

Mar. 5, 2015 (CN) .......................... 2015 1 0107910
Mar. 5, 2015 (CN) .......................... 2015 1 0109826
(Continued)

(51) Int. Cl.
*G01B 11/00* (2006.01)
*G02B 6/02* (2006.01)
(Continued)

(52) U.S. Cl.
CPC ............ *G01B 11/007* (2013.01); *G01B 5/012* (2013.01); *G01B 11/18* (2013.01);
(Continued)

(58) Field of Classification Search
CPC .. G01D 5/26; G01J 1/04; G01B 9/0291; H05B 37/02
See application file for complete search history.

(56) References Cited

U.S. PATENT DOCUMENTS 5,930,435 A * 7/1999 Laming ................. H01S 5/146
385/126
6,933,491 B2 * 8/2005 Maida, Jr. ............. E21B 47/123
250/227.14
(Continued)

FOREIGN PATENT DOCUMENTS

CN 1280408 1/2001
CN 2711951 Y 7/2005
(Continued)

OTHER PUBLICATIONS

Xu Wu et al, Experimental investigation on Erbium-doped fiber source in double-pass backward configuration, Journal of Chinese Inertial Technology, 2012,vol. 20, Issue 06, published on Dec. 31, 2012.
(Continued)

*Primary Examiner* — Sang Nguyen
(74) *Attorney, Agent, or Firm* — Kenja IP Law PC

(57) ABSTRACT

A method and equipment for dimensional measurement of a micro part based on fiber laser with multi-core fiber Bragg grating probe are provided, wherein a multi-core FBG probe
(Continued)

with FBGs (12,29) inscribed in the core or cores out of the center of the multi-core fiber is used to transform the two-dimensional or three-dimensional contact displacement into the spectrum shifts with a high sensitivity. At the meantime, the FBGs in the multi-core FBG probe (12,29) work as the wavelength selection device of the fiber laser, the wavelength of the fiber laser will change thereby. So the contact displacement is finally converted into the wavelength change of the fiber laser. The method and equipment have the advantage of high sensitivity, low probing force, compact structure, high inspecting aspect ratio and immunity to environment interference.

14 Claims, 4 Drawing Sheets

(30) Foreign Application Priority Data

| Mar. 5, 2015 | (CN) | 2015 1 0109827 |
| Mar. 5, 2015 | (CN) | 2015 1 0109828 |
| Mar. 5, 2015 | (CN) | 2015 1 0109829 |
| Mar. 5, 2015 | (CN) | 2015 1 0109830 |
| Mar. 5, 2015 | (CN) | 2015 1 0109876 |
| Mar. 5, 2015 | (CN) | 2015 1 0111225 |
| Mar. 8, 2015 | (CN) | 2015 1 0107908 |
| Mar. 8, 2015 | (CN) | 2015 1 0109990 |

(51) Int. Cl.
| G01B 11/16 | (2006.01) |
| G01B 5/012 | (2006.01) |
| H01S 3/067 | (2006.01) |
| H01S 3/16  | (2006.01) |

(52) U.S. Cl.
CPC ...... *G02B 6/02042* (2013.01); *H01S 3/06791* (2013.01); *H01S 3/1608* (2013.01)

(56) References Cited

U.S. PATENT DOCUMENTS

| 8,170,387 B2* | 5/2012 | Hartl | G02F 1/365 |
| | | | 372/18 |
| 8,934,509 B2* | 1/2015 | Savage-Leuchs | H01S 3/0941 |
| | | | 372/10 |
| 2014/0054451 A1* | 2/2014 | Abedin | G01L 11/025 |
| | | | 250/227.14 |
| 2014/0176963 A1* | 6/2014 | Kemp | G01B 9/02004 |
| | | | 356/497 |
| 2016/0013618 A1* | 1/2016 | Nagatomo | H01S 5/1833 |
| | | | 356/479 |
| 2018/0088236 A1* | 3/2018 | Eichenholz | G01S 7/4816 |

FOREIGN PATENT DOCUMENTS

| CN | 101667710 A | 3/2010 |
| CN | 102709798 A | 10/2012 |
| CN | 103759641 A | 4/2014 |
| CN | 103759642 A | 4/2014 |
| CN | 103759643 A | 4/2014 |
| CN | 103759652 A | 4/2014 |

OTHER PUBLICATIONS

Kunpeng Feng, Research on Micro-scale Dimensional Measurement Using Four Cores Fiber Bragg Grating Probe, State Outstanding Master Degree Thesis Database—Information Technology Journal, Issue 2, 2015. published on Feb. 15, 2015.

Jun. 8, 2016, International Search Report issued in the International Patent Application No. PCT/CN2016/075592.

\* cited by examiner

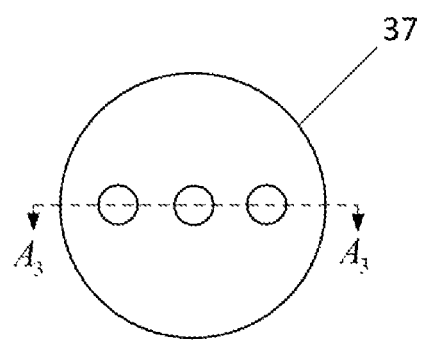
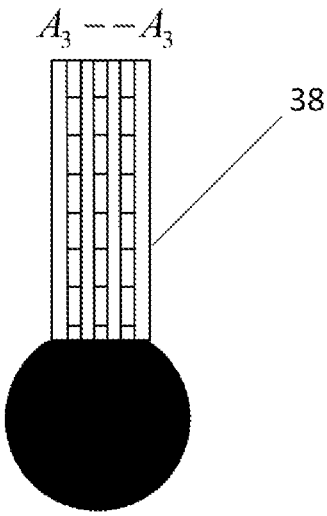
*FIG. 3E*  *FIG. 3F*
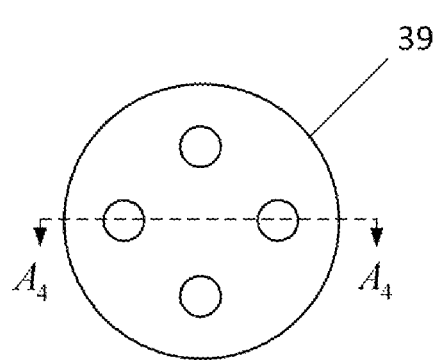
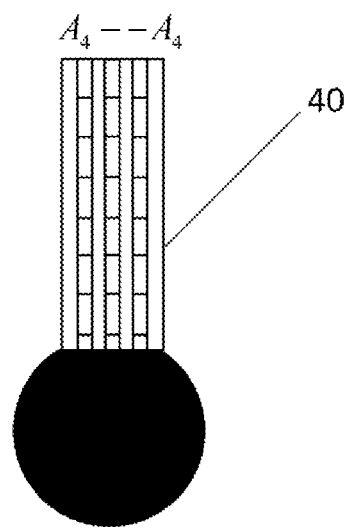
*FIG. 3G*  *FIG. 3H*

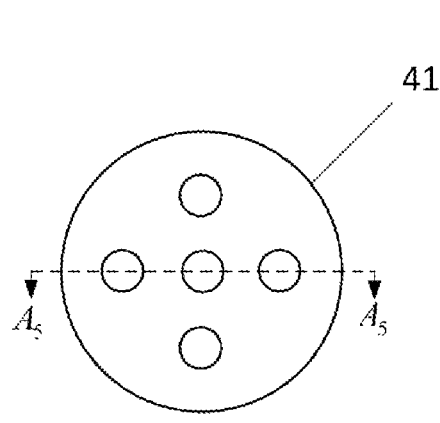 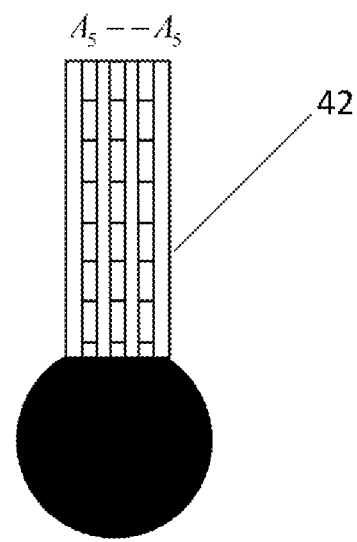
*FIG. 3I*  *FIG. 3J*

METHOD AND EQUIPMENT FOR DIMENSIONAL MEASUREMENT OF A MICRO PART BASED ON FIBER LASER WITH MULTI-CORE FBG PROBE

FIELD OF INVENTION

The present invention generally relates to methods and equipment for dimensional measurement of a micro part. More specifically, the present invention relates to methods and equipment for dimensional measurement of a micro part based on fiber laser with multi-core FBG probe.

BACKGROUND

With the fast development of manufacturing technologies, more and more structures of micro part with dimensions in the range of 0.1-1 mm and aspect ratios higher than 10:1 are now used for an increasing number of applications, including ink-jet printer nozzles, microgroove array in aerospace propulsion engines, cooling vents in turbine blade and diesel fuel injection holes, which present challenges to the measurement precision and measurable depth of existing probing systems. Therefore, it is of significance to develop a precise probing system for the equipment for coordinate measurement of a micro part, especially for one with a miniaturized size and high measurable aspect ratio.

Much work has been done on this particular aspect in recent years. For example, Gaoliang Dai, Sebastian Biitefisch, Frank Pohlenz and Hans-Ulrich Danzebrink et al. have invented a small silicon probe based on MEMS fabrication process. This probe consists of a silicon chip membrane and integrated piezoresistive elements. The piezoresistive elements are etched onto the silicon membrane to detect three-dimensional deformation, and the stylus is attached to the center of the silicon membrane. The diameter of the probe tip is less than 300 μm and probing force achieved by the membrane system is around 100 mN. However, the fabrication process is complex and produce cost is high.

Owing to the low produce cost, immune to electromagnetic interference and interruption, and lightweight and size small, more and more fiber probes are developed to achieve dimensional measurement. H. Schwenke, F. Wäldele, C. Weiskirch, H. Kunzmann have invented a fiber probe with a fiber sphere tip to backscatter the light. The stylus of this probe is 15 μm in diameter, and the spherical tip is 25 μm in diameter. The laser beam enters through the fiber and is incident on the fiber sphere tip. The back scattered light is imaged using a CCD camera, and contact displacement in xy-direction is thus transformed into the change of the center of light spot in CCD camera. This probe can be extended to a three-dimensional system by attaching a fiber sphere in the stylus and the image of this sphere is reflected on a second CCD camera using a mirror. But due to shadowing effect, CCD camera cannot obtain enough light energy to create an image, and the inspecting depth achievable with this probing method is thus limited.

Jiubin Tan and Jiwen Cui have invented a spherical coupling optical fiber probe. The spherical coupling optical fiber probe consists of incident fiber, effluent fiber and a spherical coupler combining double fibers fixed on the probe tip. The laser beam passes through the coupling lens to enter the coupler and comes out from the effluent fiber in the reverse direction. The return light passes through an object lens and is captured by a CCD camera with an objective lens. This method extends the range of inspecting depth of micro parts, but how to realize three-dimensional measurement capacity and fabricate a smaller fiber coupler with a high coupling efficiency is still an open issue.

To further extend the inspecting depth of micro parts, Jiubin Tan, Fei Wang and Jiwen Cui have invented a fiber probe based on micro focal-length collimation. A cylindrical lens with a focal length in micrometers is formed by a thin glass fiber stylus without coating. A parallel light source is focused by an objective lens to form a point light source. Then, the point light source is collimated by the cylindrical lens and the image fringe is acquired by a linear or area array CCD camera. The probing system has a displacement magnification of larger than 10,000 because the focal length of fiber cylindrical lens is very short. Light propagates outside parts and the measurable depth can thus be extended. However, the limitations of this approach include that the z-displacement is detected by buckling, which is not stable and may be hard to achieve true three-dimensional measurements.

For fiber probes, it is a challenge to make them sensitive to the z-displacement until FBG probe was invented by H Ji, H-Y Hsu, L X Kong and A B Wedding. Their probe comprises FBG in the stylus, and the contact displacements are transformed into the shifts of the center wavelength of reflection spectrum. This probe cannot be affected by shadow effect; theoretically, light can disregard the aspect ratio of micro parts and propagate in the probe. The size of probe and probing system is also miniaturized. When the probe gets contact with parts in the z-direction, FBG is subjected to compression stress and the z-displacement can be readily measured. However, this probe is not sensitive to radial contact displacements because FBG is located in the neutral stress plane when it is deflected.

Above all, fiber probes have been widely applied for measurement of micro parts and become more suitable for its optical and mechanical features of optical conductivity, easy miniaturization and low probing force. Different methods have been designed for sensing the contact displacement of the fiber probe, and the followings are some of their drawbacks:

1. The inspecting depth is restricted by shadow effect. For some probes based on light backscatter, the emission light is easily obstructed or reflected by the sidewall, and a large range of the emission angle allows few particles of light to reach the photo-detector.
2. Bulk size of probing system can hardly meet the requirement of the probing space and limits its application for the measurement of micro structures on a complex-shaped part with limited probing space.
3. Absence of multi-dimensional tactile sense and multi-dimension-decoupling capacity makes the measurement process complex and time-consuming. A real-time application can hardly be achieved.
4. The inspecting resolutions of the fiber probes are hard to be enhanced further. Most of the fiber probes have sub-micrometer resolutions only. The displacement sensitivities are too low to achieve a precise measurement.

BRIEF SUMMARY OF THE INVENTION

One purpose of the present invention is to provide a method and equipment based on fiber laser with a multi-core FBG probe for dimensional measurement of a micro part. The invention provides a method of how to convert a contact displacement to a change of wavelength of the fiber laser and get the dimensional information of a micro part. The invention also provides an equipment which consists of a fiber laser, a multi-core FBG probe for sensing the contact displacement and working as a wavelength selection device of the fiber laser meantime. The contact points on the structures of a micro part can thereby be calculated according to wavelength of the fiber laser related to the contact displacements. The dimensional measurement of a micro part can finally be achieved. Besides, the probe sensor and its source supply device are integrated as a whole, making it a small size and cost-reducing.

The present invention has the following advantages:
(1) High radial sensitivity. Thanks to the cores located out of the center of the multi-core fiber, FBGs comprised in the multi-core fiber stylus are subjected to stress several hundreds of times larger than that in normal single core FBG probe (such as the probe invented by H Ji et al.) with a same radial contact displacement and structure parameters. Therefore, radial sensitivity is increased by several hundreds of times.
(2) High inspecting aspect ratio. The inspecting depth is not affected by the shadowing effect by guiding the propagation of optical signals in the probe and separating the signal processing device from the probe. The minimum dimension of a structure of a micro part to be measured can go up to 50 μm for the limit imposed by the sphere tip of the multi-core fiber, and the measuring depth aspect ratio is up to 200:1.
(3) Compact structure. The system integrates the optical sensor with its source supply as a whole, making the size of the whole measurement system small and compact.
(4) Very low probing force. The contact measurement is achieved by deflecting a thin optical fiber. The probing force is less than several tens of mN.
(5) Immunity to environment interference. Optical fiber is immune to electromagnetic interference and temperature drift can be compensated using a reference FBG.

The foregoing has outlined rather broadly various features of the present invention in order that the detailed description that follows may be better understood. The features and attendant advantages of the present invention will be more fully appreciated upon a reading of the following illustrative embodiments with detailed description in conjunction with the accompanying drawings. Various advantages not referred to herein will occur to one skilled in the art upon employment of the invention in practice.

BRIEF DESCRIPTION OF ACCOMPANYING DRAWINGS

FIG. 3E is a cross-sectional view of multi-core FBG probe embodied as a three-core FBG;

FIG. 3F is a section $A_3$-$A_3$ view of multi-core FBG probe embodied as a three-core FBG;

FIG. 3G is a cross-sectional view of multi-core FBG probe embodied as a four-core FBG;

FIG. 3H is a section $A_4$-$A_4$ view of multi-core FBG probe embodied as a four-core FBG;

FIG. 3I is a cross-sectional view of multi-core FBG probe embodied as a five-core FBG;

FIG. 3J is a section $A_5$-$A_5$ view of multi-core FBG probe embodied as a five-core FBG.

DETAILED DESCRIPTION OF EMBODIMENTS

A multi-core FBG probe with FBGs inscribed in the core or cores out of the center of the multi-core fiber is used to transform the two-dimensional or three-dimensional contact displacement into the spectrum shifts with a high sensitivity. At the meantime, the FBGs in the multi-core FBG probe work as the wavelength selection device of the fiber laser, the wavelength of the fiber laser will change thereby. So the contact displacement is finally converted into the wavelength change of the fiber laser.

Figure 1:
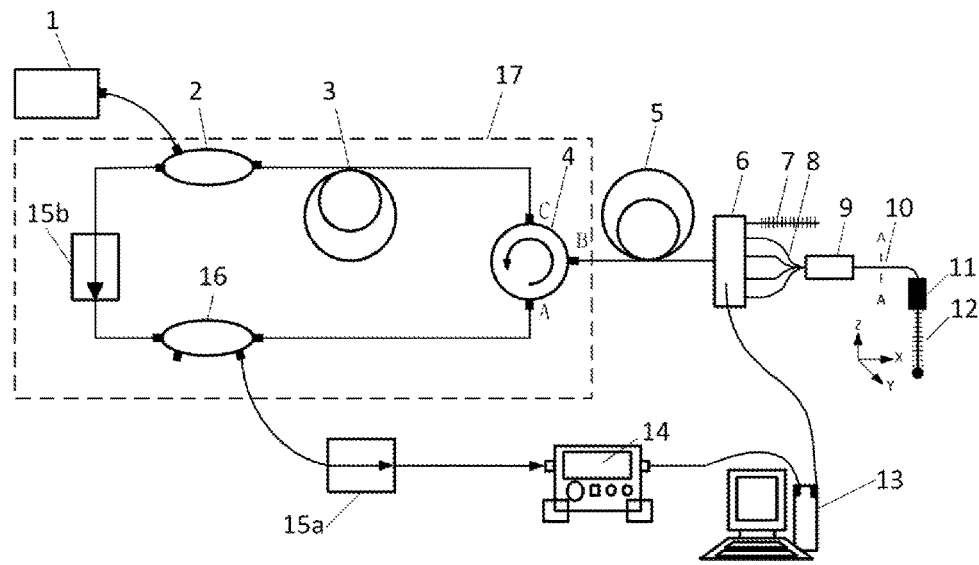
FIG. 1 illustrates construction of equipment based on ring fiber laser with a multi-core FBG probe for dimensional measurement of a micro part.

Referring to FIG. 1, the invention can be embodied in way 1: The equipment comprises:
a pumping source 1 connected with a ring cavity 17 through a wavelength division multiplexer 2,
a fiber ring laser cavity 17 consisting of wavelength division multiplexer 2, erbium-doped fiber 3, circulator 4, coupler 16 and isolator 15b,
a multi-core FBG probe 12 for sensing contact displacement,
a saturable absorber 5 used to eliminate the multi-longitudinal mode oscillation and suppress the mode hopping,
a multi-channel optical switch 6 controlled by a measurement computer 13 for switching optical paths of multi-core FBG probe 12 and reference FBG 7 in a time-division-multiplexing way,
a multi-core fiber fan-out 9 for making single mode fibers 8 access to every core of the multi-core fiber probe 12,
a multi-core fiber 10 for connecting the multi-core fiber fan-out 9 with the multi-core fiber probe 12,
a reference FBG 7 for compensating temperature drift,
an optical spectrum analyzer 14 for detecting output laser wavelength,
a measurement computer 13 utilized to calculate the contact displacement of the multi-core FBG probe and control the switch of the multi-channel optical switch 6.

The coupler 16 is connected to the optical spectrum analyzer 14 and the measurement computer 13 through the isolator 15a. The multi-channel optical switch 6, is linked with the circulator 4 through the saturable absorber 5, and is also linked with a multi-core fiber through single mode fibers 8 and the multi-core fiber fan-out 9. The multi-channel optical switch 6 is connected to the measurement computer 13 and it is also connected to the reference FBG 7. The multi-core FBG probe 12 is fixed by a probe holder on the bottom of the multi-core fiber 10. The multi-core FBG probe 12 and the reference FBG 7 can be chosen as a wavelength selection device in turn by switching the multi-channel optical switch.

The measurement method is described as follows:
The pumping light generated by an optical pumping source 1 goes into the gain medium erbium-doped fiber through a wavelength division multiplexer (WDM) 2 and generates stimulated emission light. The stimulated emission light is divided by a coupler 16. One part of the light goes into the ring cavity composed by the WDM 2, erbium-doped fiber 3, circulator 4, coupler 16 and isolator 15b successively. Another part becomes the laser output. The light propagating in the ring cavity goes into the port A of the circulator 4 and gets out from port B. Then the light passes through a saturable absorber 5 for eliminating the multi-longitudinal mode oscillation and suppressing the mode hopping, so the single longitudinal mode light with a narrow linewidth can be obtained. After that, the light enters the wavelength selection device which includes a multi-core FBG probe 12 and an external reference FBG 7. Afterwards, the reflected light goes into the port B of the circulator and gets out from port C, and continues to propagate along the ring cavity. With the increase of pumping power, the spontaneous emission will be gradually suppressed and finally the system will have a stable output with a single longitudinal mode and narrow line width. When a micro part is measured, the multi-core FBG probe contacts with the part under test, the center wavelength of reflected spectrum of FBG will shift, which will change the wavelength of the output laser. By switching multi-channel optical switches 6, the wavelength of output laser which is wavelength selected by the multi-core FBG in the probe 12 and external reference FBG 7, can be detected by an optical spectrum analyzer 14. Finally, a measurement computer 13 is used to calculate the relative contact displacement of the probe from the zero-force position, and the dimensional measurement of a micro part is realized thereby.

Figure 3A:
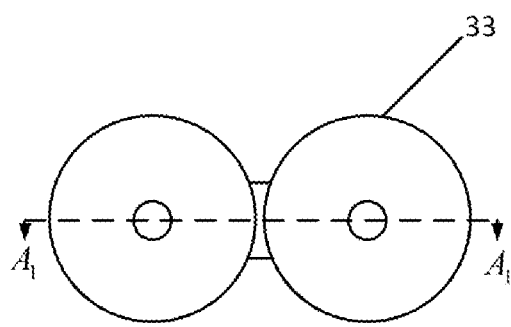
FIG. 3A is a cross-sectional view of multi-core FBG probe embodied as a twin FBG.
Figure 3B:
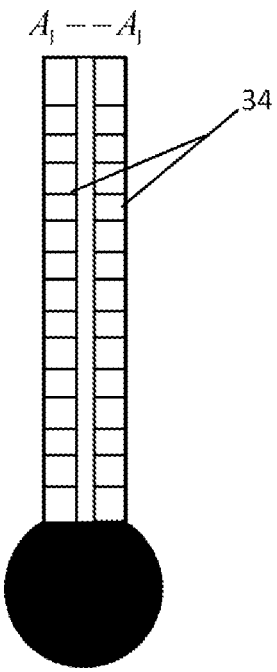
FIG. 3B is a section $A_1$-$A_1$ view of multi-core FBG probe embodied as a twin FBG.

The multi-core FBG probe 12 can be a twin FBG probe 33 shown in FIG. 3A. In data processing, the two FBGs in the two FBG probes work as laser wavelength selection device respectively, and we get wavelength of the laser output from the fiber ring laser respectively. According to the differential data of these two, one-dimensional radial displacement along the axis determined by the two fibers of the twin FBG probe and temperature drift can be decoupled. At the same time, we can get the average value of these two. The output laser wavelength when the external reference FBG 7 works as the laser wavelength selection device has also been recorded. According to the differential data of these two values above, we can get the result of the axial displacement without coupled radial displacement and temperature drift, and two-dimensional measurement of a micro part with no temperature interference is realized thereby.

Figure 3C:
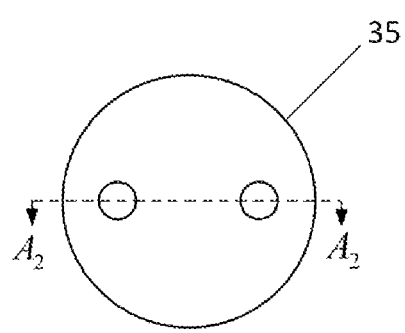
FIG. 3C is a cross-sectional view of multi-core FBG probe embodied as a two-core FBG.
Figure 3D:
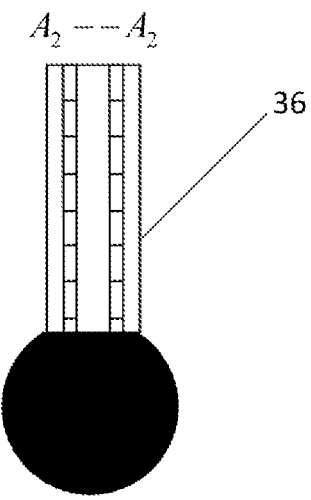
FIG. 3D is a section $A_2$-$A_2$ view of multi-core FBG probe embodied as a two-core FBG.

The multi-core FBG probe 12 can be a two-core FBG probe 35 shown in FIG. 3C. In data processing, the two FBGs in the two-core FBG probe work as the laser wavelength selection device respectively, and we get wavelength of the laser from the fiber ring laser respectively. According to the differential data of these two, one-dimensional radial displacement along the axis determined by the two cores of the two-core FBG probe and temperature drift can be decoupled. At the same time, we can get the average value of these two. The output laser wavelength when the external reference FBG 7 works as the laser wavelength selection device has also been recorded. According to the differential data of these two values above, we can get the result of the axial displacement without coupled radial displacement and temperature drift, and two-dimensional measurement of a micro part with no temperature interference is realized thereby.

The multi-core FBG probe 12 can be a three-core FBG probe 37 shown in FIG. 3E. In data processing, two eccentric FBGs in the three-core FBG probes work as the laser wavelength selection device respectively, and the wavelength of the laser is recorded respectively. According to the differential data of these two, one-dimensional radial displacement along the axis determined by the two eccentric cores of the three-core FBG probe and temperature drift can be decoupled. Meantime, we choose the center FBG in the three-core FBG probe and the external reference FBG 7 as the laser wavelength selection device respectively, and get their output wavelength respectively. According to the differential data of these two, we can get the result of the axial displacement without coupled radial displacement and temperature drift, and two-dimensional measurement of a micro part with no temperature interference is realized thereby.

The multi-core FBG probe 12 can be a four-core FBG probe 39 shown in FIG. 3G. In data processing, the two sets of orthogonal eccentric FBGs in the four-core FBG probe are chosen as the optical fiber ring laser wavelength selection devices respectively. According to the differential data of two in each set respectively, two-dimensional radial displacement along the axes determined by the two orthogonal eccentric cores of the four-core FBG probe and temperature drift can be decoupled. And we also get the average of four output laser wavelength when the four FBGs in the four-core FBG probe are chosen as the laser wavelength selection respectively. At the same time, the output laser wavelength when the external reference FBG 7 works as the laser wavelength selection device has also been recorded. According to the differential data of these two values above, we can get the result of the axial displacement without coupled radial displacement and temperature drift, and three-dimensional measurement of a micro part with no temperature interference is realized thereby.

The multi-core FBG probe 12 can be a five-core FBG probe 41 shown in FIG. 3I. In data processing, the two sets of orthogonal eccentric FBGs in the five-core FBG probe are chosen as the optical fiber ring laser wavelength selection devices respectively. According to the differential data of two in each set respectively, two-dimensional radial displacement along the axes determined by the two orthogonal eccentric cores of the five-core FBG probe and temperature drift can be decoupled. At the same time, we record the output laser wavelength when the center FBG in the five-core FBG probe and the external reference FBG work as the laser wavelength selection device respectively. According to the differential data of these two, we can get the result of the axial displacement without coupled radial displacement and temperature drift, and three-dimensional measurement of a micro part with no temperature interference is realized thereby.

Figure 2:
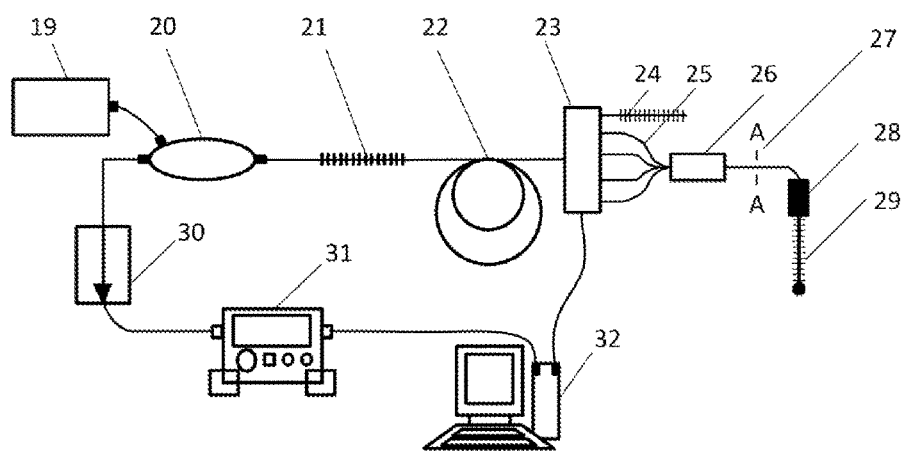
FIG. 2 illustrates construction of equipment based on linear fiber laser with a multi-core FBG probe for dimensional measurement of a micro part.

FIG. 2 illustrates the second embodiment of the invention. The embodiment of FIG. 2 is similar to the embodiment of FIG. 1 on the principle. The difference between these two is that in the first embodiment the fiber laser has a ring cavity but the second has a linear cavity.

The equipment comprises:

a single core FBG 21, an erbium-doped fiber 22, an external reference FBG 24 or a single core FBG 21, an erbium-doped fiber 22, a multi-core FBG probe 29 successively, a pumping source 19, connected with the linear cavity through a port of the wavelength division multiplexer 20. The other port of WDM 20 is connected with an optical spectrum analyzer 31 and a measurement computer 32 through an isolator 30, a multi-core FBG probe 29 for sensing contact displacement, a multi-channel optical switch 23 controlled by the measurement computer 32 for switching optical paths of multi-core FBG probe 29 and reference FBG 24 in a time-division-multiplexing way, a multi-core fiber fan-out 26 for making single mode fibers 25 access to every core of the multi-core fiber probe 29, a multi-core fiber 27 for connecting the multi-core fiber fan-out 26 with the multi-core fiber probe 29, a reference FBG 24 for compensating temperature drift, an optical spectrum analyzer 31 for detecting output laser wavelength, a measurement computer 32 utilized to calculate the contact displacement of the multi-core FBG probe 29 and control the switch of the multi-channel optical switch 23, a multi-core fiber 513 for connecting the multi-core fiber fan-out 512 with the multi-core fiber stylus 514.

The multi-core FBG probe 29 is fixed by the probe holder 28 on the bottom of the multi-core fiber 27. The multi-core FBG probe 29 and the reference FBG 24 can be switched by the multi-channel optical switch 23 to be a wavelength selection device respectively.

$\lambda_1$ is the initial center wavelength of the reference FBG 24, $\lambda_2$ is the initial center wavelength of multi-core FBG in the multi-core FBG probe 29 and $\lambda_3$ is the initial center wavelength of single core FBG 21. The working condition of linear output response of the method and device for dimensional measurement of a micro part is $$0.8\sqrt{\frac{\Delta\lambda_1^2 + \Delta\lambda_3^2}{8\ln 2}} \le |\lambda_1 - \lambda_3| \le 1.2\sqrt{\frac{\Delta\lambda_1^2 + \Delta\lambda_3^2}{8\ln 2}},$$

$$0.8\sqrt{\frac{\Delta\lambda_2^2 + \Delta\lambda_3^2}{8\ln 2}} \le |\lambda_2 - \lambda_3| \le 1.2\sqrt{\frac{\Delta\lambda_2^2 + \Delta\lambda_3^2}{8\ln 2}}$$

respectively.

And the measurement method is described as follows: The pumping light generated by a pumping source 19 passes through a port of the wavelength division multiplexer (WDM) 20 and enters into the linear cavity composed of a single core FBG 21, an erbium-doped fiber 22, an external reference FBG 24 or a single core FBG 21, an erbium-doped fiber 22, a multi-core FBG probe 29 successively. And the stimulated emission light will be produced when the light passes through the gain medium erbium-doped fiber. The light is reflected for many times in the linear cavity and its intensity is enhanced. When the gain is greater than the loss in one period of oscillation in the cavity, it will output laser with narrow linewidth. The light gets out of another port of WDM 20 and is detected by an optical spectrum analyzer 31. When a micro part is measured, the multi-core FBG probe 29 contacts with the part under test, the center wavelength of reflected spectrum of FBG will shift, which will change the wavelength of the output laser. By switching multi-channel optical switches 23 controlled by the measurement computer 32, the wavelength of output laser which is wavelength selected by the multi-core FBG in the probe 29 and external reference FBG 24, can be detected by an optical spectrum analyzer 31. Finally, a measurement computer 32 is used to calculate the relative contact displacement of the probe from the zero-force position, and the dimensional measurement of a micro part is realized thereby.

The multi-core FBG probe 29 can be a twin FBG probe 33 shown in FIG. 3A. In data processing, the two FBGs in the two FBG probe work as laser wavelength selection device respectively, and we get wavelength of the laser output from the fiber ring laser respectively. According to the differential data of these two, one-dimensional radial displacement along the axis determined by the two fibers of the twin FBG probe and temperature drift can be decoupled. At the same time, we can get the average value of these two. The output laser wavelength when the external reference FBG 24 works as the laser wavelength selection device has also been recorded. According to the differential data of these two values above, we can get the result of the axial displacement without coupled radial displacement and temperature drift, and two-dimensional measurement of a micro part with no temperature interference is realized thereby.

The multi-core FBG probe 29 can be a two-core FBG probe 35 shown in FIG. 3C. In data processing, the two FBGs in the two-core FBG probe work as the laser wavelength selection device respectively, and we get wavelength of the laser from the fiber ring laser respectively. According to the differential data of these two, one-dimensional radial displacement along the axis determined by the two cores of the two-core FBG probe and temperature drift can be decoupled. At the same time, we can get the average value of these two. The output laser wavelength when the external reference FBG 24 works as the laser wavelength selection device has also been recorded. According to the differential data of these two values above, we can get the result of the axial displacement without coupled radial displacement and temperature drift, and two-dimensional measurement of a micro part with no temperature interference is realized thereby.

The multi-core FBG probe 29 can be a three-core FBG probe 37 shown in FIG. 3E. In data processing, two eccentric FBGs in the three-core FBG probe work as the laser wavelength selection device respectively, and the wavelength of the laser is recorded respectively. According to the differential data of these two, one-dimensional radial displacement along the axis determined by the two eccentric cores of the three-core FBG probe and temperature drift can be decoupled. Meantime, we choose the center FBG in the three-core FBG probe and the external reference FBG 24 as the laser wavelength selection device respectively, and get their output wavelength respectively. According to the differential data of these two, we can get the result of the axial displacement without coupled radial displacement and temperature drift, and two-dimensional measurement of a micro part with no temperature interference is realized thereby.

The multi-core FBG probe 29 can be a four-core FBG probe 39 shown in FIG. 3G. In data processing, the two sets of orthogonal eccentric FBGs in the four-core FBG probe are chosen as the optical fiber ring laser wavelength selection devices respectively. According to the differential data of two in each set respectively, two-dimensional radial displacement along the axes determined by the two orthogonal eccentric cores of the four-core FBG probe and temperature drift can be decoupled. And we also get the average of four output laser wavelength when the four FBGs in the four-core FBG probe are chosen as the laser wavelength selection respectively. At the same time, the output laser wavelength when the external reference FBG 24 works as the laser wavelength selection device has also been recorded. According to the differential data of these two values above, we can get the result of the axial displacement without coupled radial displacement and temperature drift, and three-dimensional measurement of a micro part with no temperature interference is realized thereby.

The multi-core FBG probe 29 can be a five-core FBG probe 41 shown in FIG. 3I. In data processing, the two sets of orthogonal eccentric FBGs in the five-core FBG probe are chosen as the optical fiber ring laser wavelength selection devices respectively. According to the differential data of two in each set respectively, two-dimensional radial displacement along the axes determined by the two orthogonal eccentric cores of the five-core FBG probe and temperature drift can be decoupled. At the same time, we record the output laser wavelength when the center FBG in the five-core FBG probe and the external reference FBG work as the laser wavelength selection device respectively. According to the differential data of these two, we can get the result of the axial displacement without coupled radial displacement and temperature drift, and three-dimensional measurement of a micro part with no temperature interference is realized thereby.

There have been described and illustrated herein several embodiments of methods based on fiber laser with a multi-core FBG probe for dimensional measurement of a micro part. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. A method for dimensional measurement of a micro part based on a multi-core Fiber Bragg Grating (FBG) probe, comprising:
   directing a pumping light generated by an optical pumping source into a gain medium erbium-doped fiber through a wavelength division multiplexer (WDM) to generate a stimulated emission light;
   dividing the stimulated emission light into two portions with one portion being directed to a ring cavity composed by the WDM, an erbium-doped fiber, a circulator, the coupler and an isolator connected successively, and with the other portion being used as an output laser; wherein the portion of the stimulated emission light propagating in the ring cavity is directed into a first port of the circulator and is directed out from a second port of the circulator and then passes through a saturable absorber for eliminating multi-longitudinal mode oscillation and suppressing mode hopping to obtain a single longitudinal mode light with a narrow line width;
   directing the single longitudinal mode light into a wavelength selection device which includes a multi-core FBG probe and an external reference FBG; the single longitudinal mode light is reflected into the second port of the circulator and is directed out from a third port, and continues to propagate along the ring cavity; wherein as pumping power increases, spontaneous emission is gradually suppressed and a stable output of the system with a single longitudinal mode and narrow line width is obtained;
   contacting the multi-core FBG probe with the micro part to shift the center wavelength of a reflected spectrum of the multi-core FBG to changes the wavelength of the output laser;
   detecting respective center wavelengths of the output laser with the multi-core FBG in the probe and the external reference FBG as the wavelength selection device; and
   calculating, by a measurement computer a relative contact displacement of the probe from a zero-force position based on the detected center wavelengths of the output laser through a data processing process to achieve the dimensional measurement of the micro part.

2. The method of claim 1, wherein the multi-core FBG probe is a twin FBG probe; and
   wherein the data processing process comprising:
   obtaining two wavelength values of the laser output from the fiber ring laser with each of the two FBG in the twin FBG probe works as the laser wavelength selection device of the fiber ring laser;
   differentiating the two laser wavelengths value to decouple one-dimensional radial displacement along the axis determined by the two fibers of the twin FBG probe and a temperature drift;
   and in the meantime,
   obtaining an average value of the two laser wavelength values; and
   differentiating the average value with the output laser wavelength value with the external reference FBG works as the laser wavelength selection device to obtain a result of the axial displacement without coupled radial displacement and a temperature drift.

3. The method of claim 1, wherein the multi-core FBG probe is a two-core FBG probe; and
   wherein the data processing process comprising:
   obtaining two wavelength values of the laser from the fiber ring laser respectively with each of the two FBGs in the two-core FBG probe works as the laser wavelength selection device;
   differentiating the two laser wavelength values to decouple one-dimensional radial displacement along the axis determined by the two cores of the two-core FBG probe and a temperature drift;
   and in the meantime,
   obtaining an average value of the two laser wavelength values; and
   differentiating the average value with an output laser wavelength value with the external reference FBG works as the laser wavelength selection device to obtain a result of the axial displacement without coupled radial displacement and a temperature drift.

4. The method of claim 1, wherein the multi-core FBG probe is a three-core FBG probe; and wherein the data processing process comprising
   obtaining wavelength values of the laser with each of the two eccentric FBGs in the three-core FBG probes works as the laser wavelength selection device respectively, and
   differentiating the two wavelength values to decouple one-dimensional radial displacement along the axis determined by the two eccentric cores of the three-core FBG probe and a temperature drift;
   in the meantime,
   obtaining the output laser wavelength values of the center FBG in the three-core FBG probe and the external reference FBG with the center FBG in the three-core FBG probe and the external reference FBG (7) works as the laser wavelength selection device respectively; and
   differentiating the two output laser wavelength values to obtain a result of the axial displacement without coupled radial displacement and a temperature drift.

5. The method of claim 1, wherein the multi-core FBG probe is a four-core FBG probe; and wherein the data processing comprising:
   obtaining output laser wavelength values from two sets of orthogonal eccentric FBGs in the four-core FBG probe with each of the two sets of orthogonal eccentric FBGs being chosen as wavelength selection devices of the optical fiber ring laser;
   differentiating two output laser wavelengths in each set respectively to decouple two-dimensional radial displacement along the axes determined by the two orthogonal eccentric cores of the four-core FBG probe and a temperature drift; and obtaining an average value of four output laser wavelength values with each of the four FBGs in the four-core FBG probe selected as the laser wavelength selection;

differentiating the average value with an output laser wavelength value with the external reference FBG works as the laser wavelength selection device to obtain a result of the axial displacement without coupled radial displacement and a temperature drift.

6. The method of claim 1, wherein the multi-core FBG probe is a five-core FBG probe; and wherein the data processing comprising:

obtaining two output laser wavelength values from two sets of orthogonal eccentric FBGs in the five-core FBG probe with each of the two sets of orthogonal eccentric FBGs being chosen as the optical fiber ring laser wavelength selection devices;

differentiating the two output laser wavelengths in each set respectively to decouple two-dimensional radial displacement along the axes determined by the two orthogonal eccentric cores of the five-core FBG probe and a temperature drift;

in the meantime, obtaining two output laser wavelength values of the center FBG in the five-core FBG probe and the external reference FBG with the center FBG in the five-core FBG probe and the external reference FBG work as the laser wavelength selection device respectively; and differentiating the two wavelengths to obtain an axial displacement without coupled radial displacement and a temperature drift.

7. A method for dimensional measurement of a micro part based on linear cavity fiber laser and a multi-core Fiber Bragg Grating (FBG) probe, comprising:

generating a pumping light by a pumping source, directing the pumping light to passes through a first port of a wavelength division multiplexer (WDM) to enter into a linear cavity composed by a single core FBG, an erbium-doped fiber, an external reference FBG or a single core FBG, an erbium-doped fiber, and the multi-core FBG probe connected successively to produce a stimulated emission light when the pumping light passes through the erbium-doped fiber; wherein the stimulated emission light is reflected a plurality of times in the linear cavity to enhance its intensity; when the gain is greater than the loss in one period of oscillation in the cavity, it will output laser with narrow line width;

directing the stimulated emission light out of a second port of the WDM directing the stimulated emission light as an output laser;

contacting the multi-core FBG probe with the micro part under test to shift the center wavelength of a reflected spectrum of a multi-core FBG in the multi-core FBG which in turn changes the wavelength of the output laser;

detecting the wavelength of the output laser by switching the multi-channel optical switches to select the multi-core FBG in the multi-core FBG probe or the external reference FBG as the wavelength selecting device; and calculating, by a measurement computer, the relative contact displacement of the probe from a zero-force position via a data processing process.

8. The method of claim 7, wherein the multi-core FBG probe is a twin FBG probe; and wherein the data processing process comprising:

obtaining output laser wavelengths from the fiber ring laser with the two FBGs in the two FBG probe work as laser wavelength selection device respectively and differentiating the wavelengths to decouple one-dimensional radial displacement along the axis the axis determined by the two fibers of the twin FBG probe and a temperature drift; at the same time, obtaining an average value of these two wavelengths; and differentiating the average value with the output laser wavelength with the external reference FBG works as the laser wavelength selection device to obtain a result of the axial displacement without coupled radial displacement and a temperature drift.

9. The method of claim 7, wherein the multi-core FBG probe is a two-core FBG prob; and wherein the data processing process comprises:

obtaining wavelengths of the laser generated by the fiber ring laser with each of the two FBGs in the two-core FBG probe work as the laser wavelength selection device; and differentiating these two wavelengths to decouple one-dimensional radial displacement along the axis determined by the two cores of the two-core FBG probe and a temperature drift;

at the same time, obtaining an average value of these two laser wavelengths; and differentiating the average value with an output laser wavelength when the external reference FBG works as the laser wavelength selection device to obtain a result of the axial displacement without coupled radial displacement and a temperature drift.

10. The method of claim 7, wherein the multi-core FBG probe is a three-core FBG probe; and wherein the data processing process comprises:

obtaining a wavelength of the laser with two eccentric FBGs in the three-core FBG probe work as the laser wavelength selection device respectively; and differentiating these two wavelengths to decouple one-dimensional radial displacement along the axis determined by the two eccentric cores of the three-core FBG probe and a temperature drift;

in the meantime, obtaining output laser wavelengths of the center FBG in the three-core FBG probe with the external reference FBG as works the laser wavelength selection device respectively; and differentiating the two output laser wavelengths to obtain a result of the axial displacement without coupled radial displacement and a temperature drift.

11. The method of claim 7, wherein the multi-core FBG probe is a four-core FBG probe; and wherein the data processing process comprises:

obtaining laser output wavelengths with the two sets of orthogonal eccentric FBGs in the four-core FBG probe chosen as the optical fiber ring laser wavelength selection devices respectively; and differentiating the wavelengths to decouple two-dimensional radial displacement along the axes determined by the two orthogonal eccentric cores of the four-core FBG probe and a temperature drift;

and at the same time;

obtaining an average of four output laser wavelength when the four FBGs in the four-core FBG probe are chosen as the laser wavelength selection respectively; and differentiating the average value with an output laser wavelength recorded when the external reference FBG works as the laser wavelength selection device to obtain a result of the axial displacement without coupled radial displacement and a temperature drift.

12. The method of claim 7, wherein the multi-core FBG probe is a five-core FBG probe; and wherein the data processing process comprises:
choosing the two sets of orthogonal eccentric FBGs in the five-core FBG probe as the optical fiber ring laser wavelength selection devices respectively;
according to the differential data of two in each set respectively, two-dimensional radial displacement along the axes determined by the two orthogonal eccentric cores of the five-core FBG probe and a temperature drift be decoupled;
at the same time,
obtaining output laser wavelengths with the center FBG in the five-core FBG probe; and
the external reference FBG work as the laser wavelength selection device respectively and differentiating the output laser wavelengths to obtain a result of the axial displacement without coupled radial displacement and a temperature drift.

13. An equipment for dimensional measurement of a micro part, comprising:
a linear cavity fiber laser comprising
a linear cavity composed of a single core Fiber Bragg Grating (FBG), an erbium-doped fiber, an external reference FBG or a second single core FBG, and an erbium-doped fiber connected successively; and
a pumping source, connected to the linear cavity through a first port of a wavelength division multiplexer (WDM);
a multi-core FBG probe for sensing a contact displacement,
a multi-channel optical switch controlled by a measurement computer for switching optical paths of the multi-core FBG probe and the external reference FBG in a time-division-multiplexing manner;
a multi-core fiber fan-out for allowing single mode fibers accessible to each core of the multi-core fiber probe, wherein the multi-core fiber fan-out is connected to a multi-core fiber of the multi-core fiber probe;
a reference FBG for compensating a temperature drift,
an optical spectrum analyzer (31) for detecting output laser wavelength;
a measurement computer to calculate the contact displacement of the multi-core FBG probe and control the switch of the multi-channel optical switch, wherein the multi-core FBG probe is fixed by the probe holder on the bottom of the multi-core fiber;
wherein a second port of the WDM is connected to the optical spectrum analyzer and the measurement computer through an isolator,
the multi-core FBG probe and the reference FBG are switchable by the multi-channel optical switch to function as a wavelength selection device respectively;
wherein the working condition of linear output response of the device for dimensional measurement of a micro part is defined by:

$$0.8\sqrt{\frac{\Delta\lambda_1^2 + \Delta\lambda_3^2}{8\ln 2}} \leq |\lambda_1 - \lambda_3| \leq 1.2\sqrt{\frac{\Delta\lambda_1^2 + \Delta\lambda_3^2}{8\ln 2}},$$

$$0.8\sqrt{\frac{\Delta\lambda_2^2 + \Delta\lambda_3^2}{8\ln 2}} \leq |\lambda_2 - \lambda_3| \leq 1.2\sqrt{\frac{\Delta\lambda_2^2 + \Delta\lambda_3^2}{8\ln 2}}$$

wherein
$\lambda_1$ is the initial center wavelength of the reference FBG,
$\lambda_2$ is the initial center wavelength of the multi-core FBG in the multi-core FBG probe; and
$\lambda_3$ is the initial center wavelength of the single core FBG.

14. The equipment of claim 13, wherein the multi-core FBG probe is a twin FBG, a two-core FBG, a three-core FBG, a four-core FBG, or a five-core FBG.

* * * * *